United States Patent
Masuda

(10) Patent No.: US 7,158,782 B2
(45) Date of Patent: Jan. 2, 2007

(54) WIRELESS COMMUNICATION DEVICE

(75) Inventor: Yasuhiko Masuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 219 days.

(21) Appl. No.: 10/694,442

(22) Filed: Oct. 28, 2003

(65) Prior Publication Data

US 2004/0137913 A1 Jul. 15, 2004

(30) Foreign Application Priority Data

Oct. 29, 2002 (JP) ............................ 2002-314024

(51) Int. Cl.
*H04M 3/00* (2006.01)
(52) U.S. Cl. ................... 455/418; 455/456.6; 455/457; 455/456.3; 342/357.06; 342/357.09
(58) Field of Classification Search ................ 455/418, 455/456.6, 457, 422.1, 456.3; 342/357.06, 342/357.09
See application file for complete search history.

(56) References Cited

U.S. PATENT DOCUMENTS

| 6,516,192 B1 * | 2/2003 | Spaur et al. ................. 455/450 |
| 6,791,959 B1 * | 9/2004 | Palmer et al. ............... 370/332 |
| 2001/0001763 A1 * | 5/2001 | Ito ............................. 455/512 |
| 2002/0081974 A1 * | 6/2002 | Eaton et al. .................. 455/41 |
| 2002/0086681 A1 * | 7/2002 | Gilham et al. ............. 455/456 |
| 2003/0144018 A1 * | 7/2003 | Minnick et al. ............ 455/519 |
| 2003/0194993 A1 * | 10/2003 | Fomukong ............... 455/414.1 |

FOREIGN PATENT DOCUMENTS

| JP | 11-331176 A | 11/1999 |
| JP | 2000-314771 A | 11/2000 |

* cited by examiner

*Primary Examiner*—Danh Cong Le
(74) *Attorney, Agent, or Firm*—Westerman, Hattori, Daniels & Adrian, LLP.

(57) ABSTRACT

The present invention relates to a technology by which a wireless communication device performs wireless communications under communication conditions suited to where the device is located. The wireless communication device, when performing the wireless communications with other device, recognizes the present position, determines the communication conditions mapping to position information thereof, and sets these communication conditions in a communication control unit thereof. The communication control unit executes the wireless communications based on the communication conditions. Thus, the wireless communications can be performed by automatically setting the proper communication conditions without causing any intricacy in operation even if configured in a way that can support a plurality of countries and a plurality of connection services.

5 Claims, 11 Drawing Sheets

FIG. 3

| COUNTRY CODE | MAXIMUM NUMBER OF CHANNELS | CHANNEL FREQUENCY BAND | TIME ZONE |
|---|---|---|---|
| PST | 11 | 26.XXXGHz | GMT-8 |
| PDT | 11 | 26.XXXGHz | GMT-7 |
| MST | 11 | 26.XXXGHz | GMT-7 |
| MDT | 11 | 26.XXXGHz | GMT-6 |
| CST | 11 | 26.XXXGHz | GMT-6 |
| CDT | 11 | 26.XXXGHz | GMT-5 |
| EST | 11 | 26.XXXGHz | GMT-5 |
| EDT | 14 | 26.XXXGHz | GMT-4 |
| GMT | 14 | 26.XXXGHz | GMT+0 |
| JST | 14 | 26.XXXGHz | GMT+9 |
| MET | 14 | 26.XXXGHz | GMT+1 |
| MEST | | 26.XXXGHz | GMT+2 |

FIG. 9

| POSITION INFORMATION (EAST LONGITUDE, NORTH LATITUDE) | ACCESS POINT | CARRIER CODE |
|---|---|---|
| 139° 44' ..., 35° 39' ... | 10a | AAA |
| 139° 47' ..., 35° 35' ... | 10e | AAA |
| 137° 35' ..., 34° 40' ... | 10b | BBB |
| 137° 36' ..., 34° 41' ... | 10f | BBB |
| 137° 37' ..., 34° 42' ... | 10g | BBB |
| 137° 44' ..., 34° 43' ... | 10c | CCC |
| 139° 48' ..., 35° 34' ... | 10h | AAA |
| 137° 44' ..., 34° 44' ... | 10i | CCC |
| 139° 49' ..., 35° 33' ... | 10j | AAA |

FIG. 10

| CARRIER CODE | ID | PASSWORD | PROTOCOL |
|---|---|---|---|
| AAA | AOOOOO | AXXXXX | TCP |
| BBB | BOOOOO | BXXXXX | TCP |
| CCC | COOOOO | CXXXXX | WP-HTTP |

WIRELESS COMMUNICATION DEVICE

BACKGROUND OF THE INVENTION

The present invention relates generally to a technology of performing wireless communications under communication conditions suited to a location, and more particularly to a wireless communication device constructed to detect, based on, e.g., GPS (Global Positioning System), a country where the device is utilized and to automatically execute setting suited to this country.

What is generally conducted in enterprises and universities each having a multiplicity of computers is that the computers are connected to each other via LANs (Local Area Networks), wherein they share resources and files with each other and exchange e-mails.

Further, the computers have widely spread into homes, and a large number of persons get possessed of a plurality of computers such as a desktop type computer and a mobile that meet their purposes. Hence, there is an increased number of such opportunities that the LANs are built up even in homes.

What has hitherto been a mainstream among the conventional LANs is, however, a wired LAN using a coaxial cable, a twisted pair cable or an optical fiber cable. The wired LAN is resistible against disturbances such as noises and is easy to keep a high-quality connection. The wired LAN has, however, problems in which constructions for wiring are required, and wires are extended round. Under such circumstances, it can be considered to utilize a wireless LAN where wireless communications are performed by use of radio waves, infrared-rays, etc. Further, in organizations such as the enterprises, the universities, etc., there is seen a progress of utilizing the wireless LANs for changing a layout of architecture as the number of using terminals increases and for mobile terminals (refer to a patent document 1 (Japanese Patent Application Laid-Open Publication No.11-331176 (paragraph numbers 2 through 4) and a patent document 2 (Japanese Patent Application Laid-Open Publication No.2000-314771 (paragraph number 5)).

A wireless communication device in a wireless LAN station (access point), a wireless LAN adapter, etc., disclosed therein needs to change specifications for every country because of communication conditions such as the number of channels, etc. being different in each country.

In the case of the wireless LAN adapter pursuant to, e.g., IEE802.11b, it is approved in U.S.A. that 1 through 11 channels (ch) are used, while in Japan the use of 1 through 14 channels (ch) is approved.

Therefore, a manufacturer of the wireless LAN adapter created firmware, etc. at a developing stage so that the device utilized in U.S.A. can use 1 through 11 channels and so that the device utilized in Japan can use 1 through 14 channels.

It is, however, an extremely time-consuming work to develop the firmware, etc. for every country. Moreover, there occur overlapped works, resulting in a decline of efficiency.

Such being the case, it can be considered to provide an architecture that can support the communication conditions of the countries where the device is utilized in a way that creates universal firmware and changes the setting. In this case, however, there arises such a problem that, for example, a user must set in accordance with the system of the user's country in advance of utilizing the wireless communication device, with the result that the operation becomes complicated.

Further, there is a scheme that all the known time zones are incorporated into the firmware, etc. at the developing stage for selecting the time zone, and the user is prompted to select it. In this case also, the operation becomes complicated when utilizing the device.

SUMMARY OF THE INVENTION

It is an object of the present invention, which was devised in view of the problems inherent in the prior arts, to provide a technology capable of performing the communications under proper communication conditions without bringing about any intricacy in operation by providing an architecture that can support plural patterns of communication conditions.

A wireless communication device according to the present invention, when performing wireless communications with other devices, recognizes a present position, determines the communication conditions mapping to this piece of position information, and sets these communication conditions in a communication control unit thereof. The communication control unit performs the wireless communications based on the communication conditions.

To accomplish the above object, according to one aspect of the present invention, a wireless communication device performing wireless communications with other devices includes a communication unit used for performing the wireless communications, a communication control unit controlling the communication unit on the basis of a predetermined communication condition, a position information acquiring unit recognizing a present position, a communication condition determining unit determining a communication condition corresponding to position information acquired by the position information acquiring unit, and a condition setting unit setting, in the communication control unit, the communication condition determined by the communication condition determining unit.

With this architecture, according to the present invention, the wireless communications can be performed by automatically setting proper communication conditions without causing any intricacy in operation even if configured in a way that can support a plurality of countries and a plurality of connection services.

In the wireless communication device according to the present invention, the position information acquiring unit may acquire the position information by receiving radio waves from a GPS (Global Positioning System) satellite.

In the wireless communication device according to the present invention, the communication condition determining unit may determine at least one of the number of channels, a time zone, an ID and a password as the communication condition.

In the wireless communication device according to the present invention, the communication condition determining unit may detect, based on the position information, a country in which the device is utilized, select the time zone of this country as the communication condition suited to this country, and determine a local time of this country on the basis of the selected time zone.

In the wireless communication device according to the present invention, the communication condition determining unit may detect, based on the position information, a country in which the device is utilized, and set an upper limit of the number of channels provided in this country as the communication condition suited to this country.

In the wireless communication device according to the present invention, the condition setting unit may set the communication condition till the communications are started since a power source of the wireless communication device has been switched ON.

According to another aspect of the present invention, a wireless communication method in a wireless communication device performing wireless communications with other devices, includes recognizing a present position, determining a communication condition corresponding to position information of the recognized position, setting the communication condition in a communication control unit of the wireless communication device, and performing the wireless communications on the basis of the communication condition.

In the wireless communication method according to the present invention, the above recognition of the present position may involve acquiring the position information by receiving radio waves from a GPS satellite and recognizing the present position on the basis of the position information.

In the wireless communication method according to the present invention, the above determination of the communication condition may involve determining at least one of the number of channels, a time zone, an ID and a password as the communication condition.

In the wireless communication method according to the present invention, the above determination of the communication condition may involve detecting, based on the position information, a country in which the device is utilized, selecting the time zone of this country as the communication condition suited to this country, and determining a local time of this country on the basis of the selected time zone.

In the wireless communication method according to the present invention, the above determination of the communication condition may involve detecting, based on the position information, a country in which the device is utilized, and setting an upper limit of the number of channels provided in this country as the communication condition suited to this country.

According to a further aspect of the present invention, there is provided a recording medium recorded with a program readable by a wireless communication device performing wireless communications with other devices, this program making the wireless communication device execute recognizing a present position, determining a communication condition corresponding to position information of the recognized position, setting the communication condition in a communication control unit of the wireless communication device, and performing the wireless communications on the basis of the communication condition.

In the recording medium recorded with the program readable by the wireless communication device according to the present invention, the above recognition of the present position may involve acquiring the position information by receiving radio waves from a GPS satellite and recognizing the present position on the basis of the position information.

In the recording medium recorded with the program readable by the wireless communication device according to the present invention, the above determination of the communication condition may involve determining at least one of the number of channels, a time zone, an ID and a password as the communication condition.

In the recording medium recorded with the program readable by the wireless communication device according to the present invention, the above determination of the communication condition may involve detecting, based on the position information, a country in which the device is utilized, selecting the time zone of this country as the communication condition suited to this country, and determining a local time of this country on the basis of the selected time zone.

In the recording medium recorded with the program readable by the wireless communication device according to the present invention, the above determination of the communication condition may involve detecting, based on the position information, a country in which the device is utilized, and setting an upper limit of the number of channels provided in this country as the communication condition suited to this country.

Herein, the recording medium recorded with the program readable by the wireless communication device includes recording mediums capable of storing information such as data, programs, etc. electrically, magnetically, optically and mechanically or by chemical action, which can be all read by the wireless communication device. What is demountable out of the wireless communication device among those recording mediums may be, e.g., a flexible disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type recording mediums within the computer.

According to the present invention, there is provided a wireless communication program in a wireless communication device performing wireless communications with other devices, said program making said wireless communication device execute:

recognizing a present position;

determining a communication condition corresponding to position information of the recognized position;

setting the communication condition in a communication control unit of said wireless communication device; and performing the wireless communications on the basis of the communication condition.

In the wireless communication program according to the present invention, the above recognition of the present position may involve acquiring the position information by receiving radio waves from a GPS satellite and recognizing the present position on the basis of the position information.

In the wireless communication program according to the present invention, the above determination of the communication condition may involve determining at least one of the number of channels, a time zone, an ID and a password as the communication condition.

In the wireless communication program according to the present invention, the above determination of the communication condition may involve detecting, based on the position information, a country in which the device is utilized, selecting the time zone of this country as the communication condition suited to this country, and determining a local time of this country on the basis of the selected time zone.

In the wireless communication program according to the present invention, the above determination of the communication condition may involve detecting, based on the position information, a country in which the device is utilized, and setting an upper limit of the number of channels provided in this country as the communication condition suited to this country.

According to the present invention, said components can be combined to the greatest possible degree.

BRIEF DESCRIPTION OF THE DRAWINGS

The foregoing and other features and advantages of the present invention will become more readily appreciated as the same becomes better understood by reference to the following detailed description when taken into conjunction with the accompanying drawings wherein:

FIG. 3 is an explanatory diagram showing a communication condition table 14;

FIG. 9 is an explanatory diagram showing a position information table in the embodiment 2;

FIG. 10 is an explanatory diagram showing a communication condition table in the embodiment 2.

DETAILED DESCRIPTION OF THE PREFERRED EMBODIMENTS

§ Embodiment 1

Embodiments of the present invention will hereinafter be described with reference to FIGS. 1 through 5.

<Whole Architecture>

Figure 1:
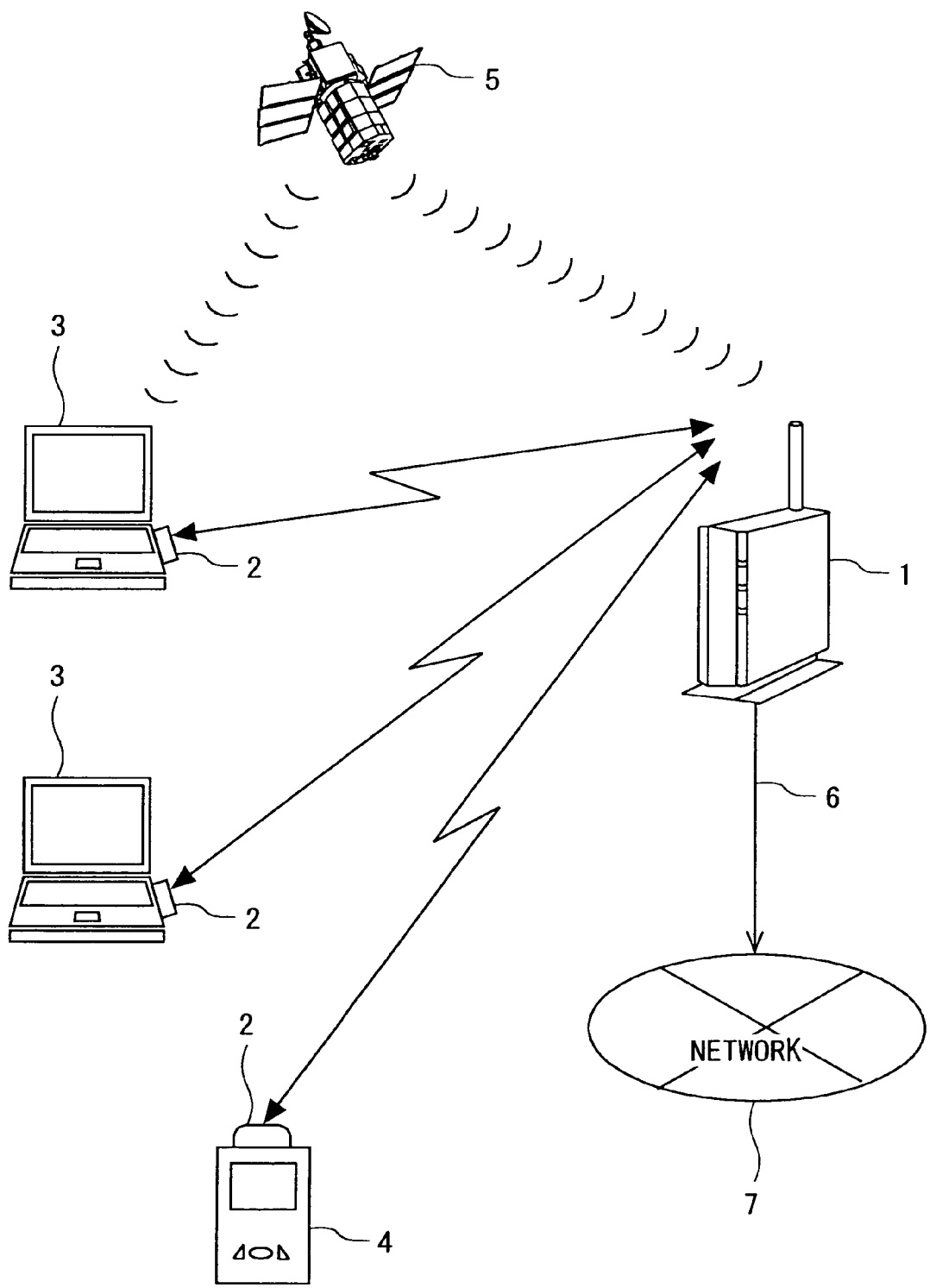
FIG. 1 is an explanatory view showing an outline of a wireless LAN system according to the present invention.

FIG. 1 is an explanatory view showing an outline of a wireless LAN (Local Area Network) system utilizing a wireless communication device according to the present invention.

Referring to FIG. 1, there are shown a wireless LAN station (access point) 1, a wireless LAN adapter 2, computers 3 and 4, and a GPS (Global Positioning System) satellite 5.

The wireless LAN station 1 and the wireless LAN adapter 2, which are classified as wireless communication devices pursuant to IEEE 802.11b, perform wireless communications through radio waves having a frequency band of 2.4 GHz. Further, the wireless LAN station 1 is connected via a LAN cable 6 also to a wired LAN 7.

The computer 3 is, for example, a notebook type personal computer. The computer 3 is used for such applications that a user moves (roams) among within local area networks as the user intends (which is known as "roaming") and inputs data in a visited network, and so forth. This computer 3 is attached with the wireless LAN adapter 2 for performing wireless LAN communications.

The computer 4 is a portable information terminal (which is a so-called PDA (Personal Digital Assistant) and is attached with the wireless LAN adapter 2 for performing the wireless LAN communications.

As explained above, according to the embodiment 1, the wireless LAN is configured by the respective computers 3, 4 and the wireless LAN station 1.

The wireless LAN station 1 and the wireless LAN adapter 2, when the mobile computer is used, specify through the GPS a country where the mobile computer is located at the present, whereby the wireless communications are performed under communication conditions suited to this country.

<Device Architecture>

Figure 2:
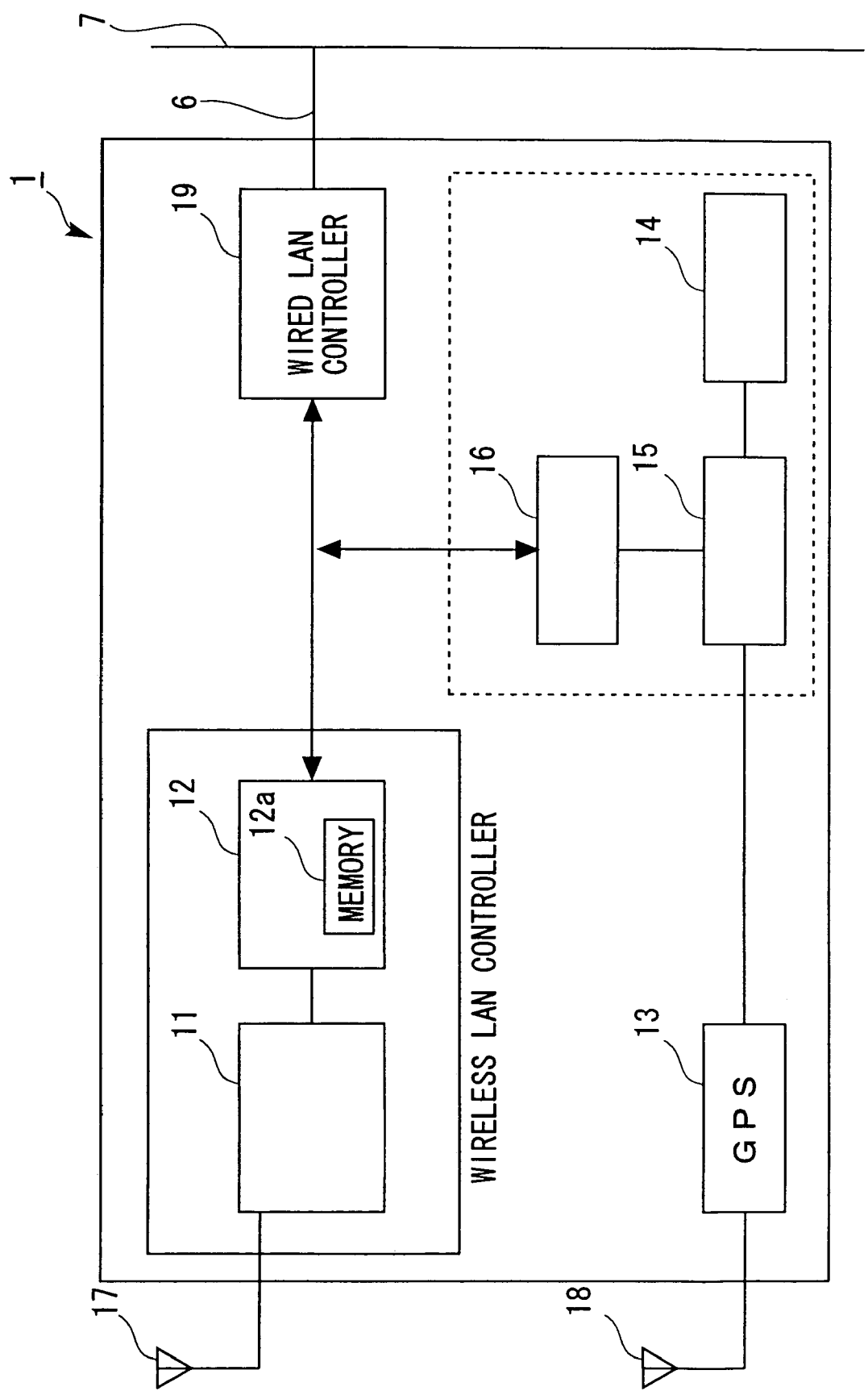
FIG. 2 is a block diagram showing a wireless LAN station 1.

FIG. 2 is a block diagram illustrating the wireless LAN station 1.

As illustrated in FIG. 2, the wireless LAN station 1 includes a wireless LAN interface unit (corresponding to a communication unit) 11, a communication control unit 12, a GPS receiving unit (corresponding to a position information acquisition unit) 13, a communication condition table 14, a communication condition determining unit 15, a condition setting unit 16, a wireless LAN antenna 17, a GPS antenna 18 and a wired LAN controller 19.

The wireless LAN interface unit 11 is used for transmitting and receiving the data via the wireless LAN antenna 17, thus performing the wireless communications with each of the wireless LAN adapters 2.

The communication control unit 12 controls, based on predetermined communication conditions, the wireless LAN interface unit 11.

The GPS receiving unit 13 recognizes a present position (i.e., acquires position information) by receiving radio waves from the GPS satellite. This GPS receiving unit 13 has, in the case of acquiring, e.g., a latitude and a longitude as the position information, a position information table stored with information indicating which country encompasses a location defined by the latitude and longitude acquired. Then, the GPS receiving unit 13, when acquiring the aforementioned position information, refers to the position information table and outputs data of the country (country code) mapping thereto.

The communication condition table 14 is, as shown in FIG. 3, stored with communication conditions such as a maximum number of channels, a channel frequency band and a time zone each mapping to the country code.

The communication condition determining unit 15 searches out the communication conditions mapping to the position information (country code) acquired by the GPS receiving unit 13 from the communication condition table 14, thus determining the communication conditions.

The condition setting unit 16 sets the communication conditions determined by the communication condition determining unit 15 in the communication control unit 12.

The wired LAN controller 19 performs the communications with the terminals building up the wired LAN 7. The wired LAN controller 19 receives via the wireless LAN interface unit 11 the data transmitted from the computer residing in the wireless LAN, and outputs the same data to the computer in the wired LAN. The wired LAN controller 19 also receives the data transmitted from the computer residing in the wired LAN, and outputs the same data via the wireless LAN interface unit 11 to the computer in the wireless LAN.

Figure 4:
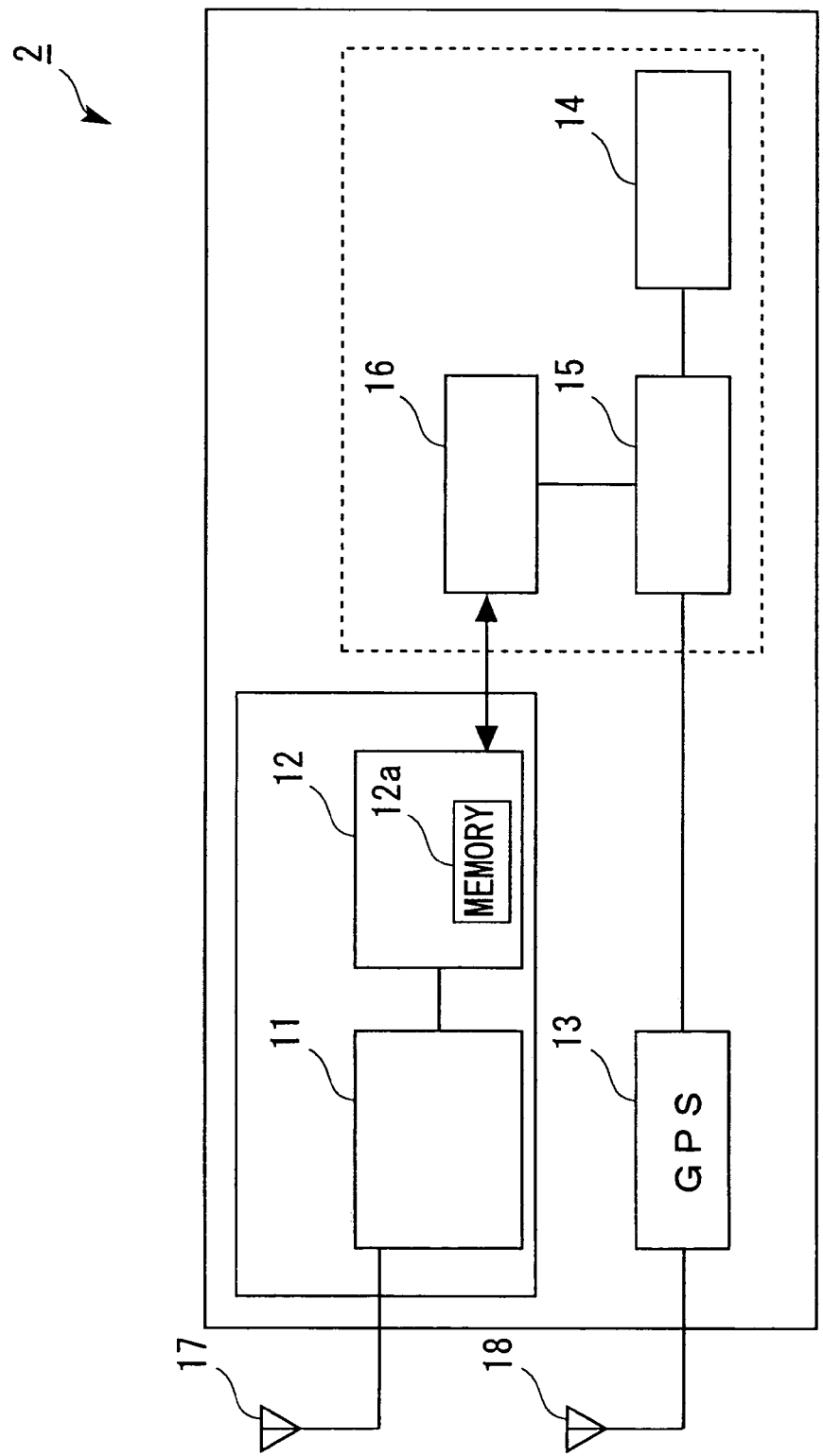
FIG. 4 is a block diagram showing a wireless LAN adapter 2.

FIG. 4 shows next a block diagram of the wireless LAN adapter 2.

As shown in FIG. 4, the wireless LAN adapter 2 includes the wireless LAN interface unit (corresponding to the communication unit) 11, the communication control unit 12, the GPS receiving unit 13, the communication condition table 14, the communication condition determining unit 15, the condition setting unit 16, the wireless LAN antenna 17 and the GPS antenna 18.

The wireless LAN interface unit 11 is used for transmitting and receiving the data via the wireless LAN antenna 17, thus performing the wireless communications with the wireless LAN station 1. Note that the same components as those of the wireless LAN station 1 are marked with the same numerals, and their repetitive explanations are herein omitted.

<Procedure of Setting Communication Conditions>

Figure 5:
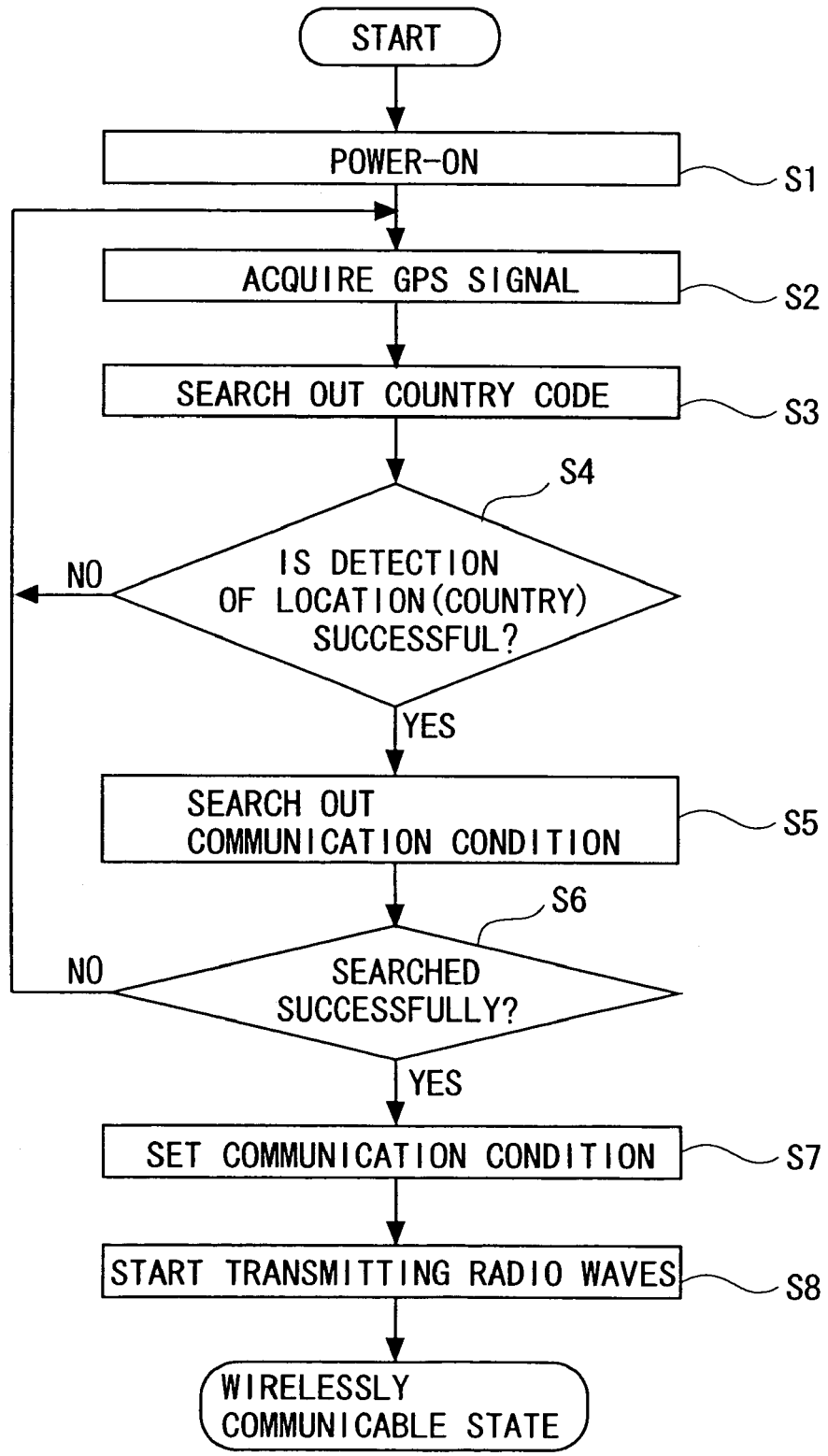
FIG. 5 is a flowchart showing a procedure (steps) of setting communication conditions.

FIG. 5 is a flowchart showing a procedure (steps) of setting the communication conditions in the wireless communication device as the wireless LAN station 1 or the wireless LAN adapter 2.

To start with, upon switching ON a power source of this communication device as the station 1 or the adapter 2, the GPS receiving unit 13 detects this power-ON (step 1 abbreviated to S1; abbreviations of the following steps will hereinafter be the same as S1), and acquires the position information from the GPS satellite 5 via the GPS antenna 18 (S2).

Then, the GPS receiving unit 13 searches out the country code of the country where the terminal is located at the present on the basis of the position information from the position information table (S3).

The GPS receiving unit 13 judges whether or not the position information has been successfully detected, i.e., the country code has been successfully searched out (S4). If not successful, the GPS receiving unit 13 returns to the acquisition of the position information in S2. Whereas if successful, the GPS receiving unit 13 outputs this country code to the communication condition determining unit 15.

The communication condition determining unit 15 having received the country code searches out the communication conditions mapping to this country code from the communication condition table 14 (S5). The communication condition determining unit 15 judges whether the communication conditions have been successfully searched out or not (S6). If unsuccessful, the communication condition determining unit 15 returns to the acquisition of the position information in S2. Whereas if successful, the communication condition determining unit 15 outputs the searched-out communication conditions to the condition setting unit 16. Then, the condition setting unit 16 sets the communication conditions in the communication control unit 12, to be more specific, stores them on the memory 12*a* of the communication control unit 12 (S7).

Subsequently, the communication control unit 12 refers to the memory 12*a* and performs the wireless communications on the basis of these communication conditions (S8).

The wireless LAN station 1 in the embodiment 1, upon the power-ON (S1), in the case of having acquired, for example, 139 degrees 44 minutes 28 seconds 8759 of east longitude and 35 degrees 39 minutes 29 seconds 1572 of north latitude as pieces of position information (S2), searches out a country code JST that identifies Japan by referring to the position information table (S3, S4).

The wireless LAN station 1 searches out, as the communication conditions mapping to this country code JST, 14 as a maximum number of channels, GMT +9:00 as a time zone (which is indicated by what Greenwich mean time (GMT) plus 9 hours becomes), etc. from the communication condition table 14 (S5, S6).

With this process, the wireless LAN station 1 sets a local time in a timer (unillustrated) on the basis of the time zone GMT+9:00. For instance, if the time of the timer is coincident with GMT, the local time is set by adding 9 hours to the present time. Further, if the user inputs the time of the timer, the local time is set so that the time of the timer is coincident with the time based on the time zone GMT+9:00. Moreover, the wireless LAN station 1 performs the wireless communications by utilizing the 14 channels at the maximum (S7, S8).

Note that the country code is, when assigned to one country, not limited to the single code and may also be arbitrarily divided, wherein a plurality of codes may be assigned to one country.

Figure 6:
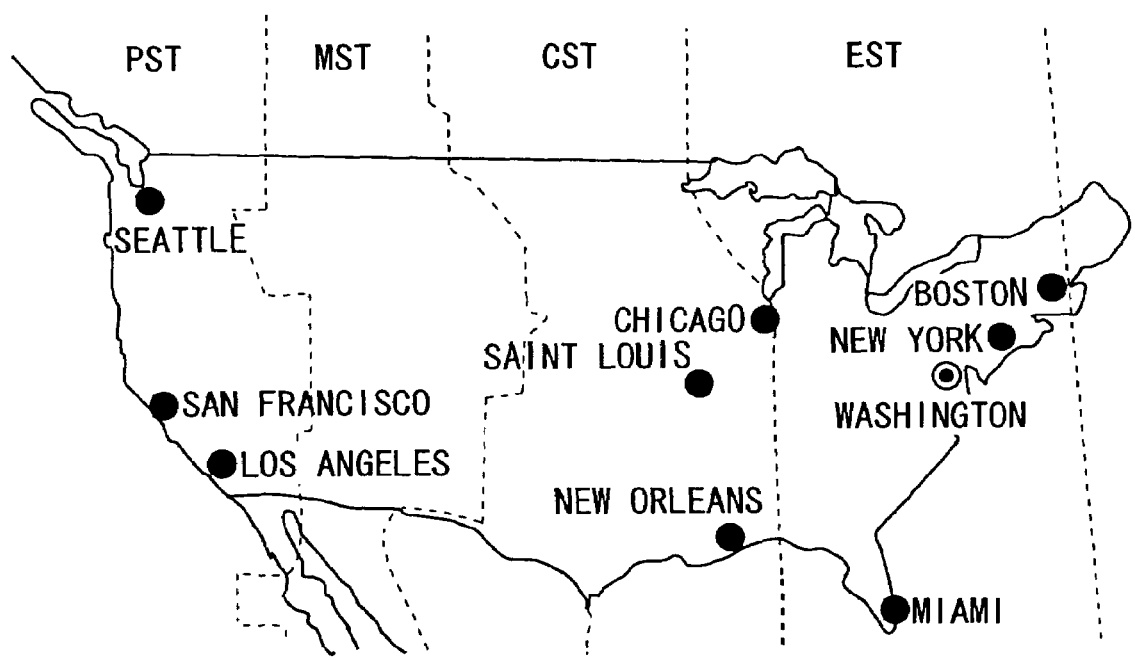
FIG. 6 is an explanatory view showing a case of allocating a plurality of country (local) codes.

For example, as for the U.S.A., four local codes matching with local time zones may be assigned as shown in FIG. 6. With this contrivance, the wireless LAN station 1, if the power source is switched ON in San Francisco, searches out a country code PST, sets a time zone of GMT-8, and performs the wireless communications by use of 11 channels at the maximum.

Further, another scheme may be adopted, wherein the GPS receiving unit 13 acquires date/time information from the GPS satellite 5, then judges whether it is summer time or not, and searches out communication conditions mapping to a result of this judgement. For instance, if the power source is switched ON in New York on a certain date during a period of Sunday of the first week in April through Sunday of the last week in October, the wireless LAN station 1 searches out a country code EDT, then sets a time zone T-4, and performs the wireless communications by use of 11 channels at the maximum. If the power source is switched ON in New York on a date other than those given above, the wireless LAN station 1 searches out a country code EST, then sets a time zone GMT-5 and performs the wireless communications by utilizing the 11 channels at the maximum.

As discussed above, the wireless communication device according to the embodiment 1 is a device universal and adaptable to a plurality of countries by setting the communication conditions. This wireless communication device is capable of performing the communications under the communication conditions pursuant to the laws of the country where the device is utilized and suited to the time zones without bringing about intricacy in operation.

Further, according to the embodiment 1, after switching ON the power source, the present position is confirmed before starting the wireless communications, and the communication conditions are set, and hence there is no possibility of starting the communications under improper communication conditions due to a mistake and a delay in setting.

Moreover, there is no necessity of developing the devices different in each country, and it is therefore possible to restrain both the time and costs for developing those devices. Further, even in a case where the wireless communication device utilized in, e.g., U.S.A. is brought into Japan, the device automatically executes the country-to-country setting and thus can be utilized without causing the user to do a time-consuming setting. This auto-setting scheme exhibits a great effect especially in the wireless LAN adapter having an opportunity of being carried abroad or otherwise and utilized there in the way that a PC card for wireless communication is used. Furthermore, the device executes the auto-setting also about selecting the time zone, and hence there is neither a necessity of changing default values for every country when the product is shipped nor a necessity of the user's setting.

<Modified Example>

According to the embodiment discussed above, the communication conditions are set each time the power source of the wireless communication device is switched ON. The present invention is not limited to this scheme and may include a scheme that the communication conditions are set only when the power source is switched ON for the first time, and the communications are performed by referring to this setting onwards.

Figure 7:
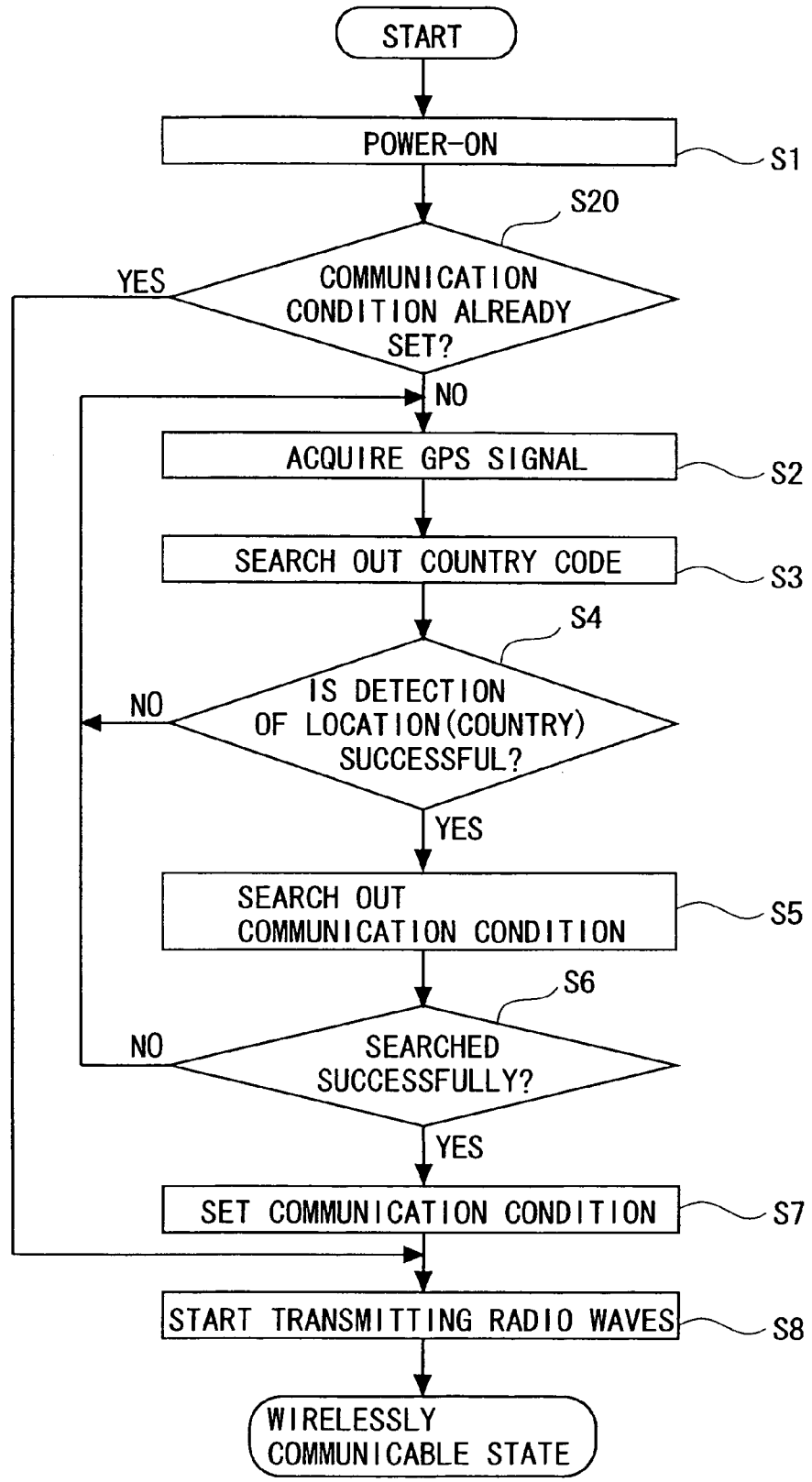
FIG. 7 is a flowchart showing a procedure of setting the communication conditions.

FIG. 7 shows a procedure of setting the communication conditions in the way described above. The wireless communication device is different from the device in the embodiment discussed above in terms of only the communication condition setting procedure, and other configurations thereof are the same as those of the device shown in FIG. 2 or 3.

To begin with, when the power source of the wireless communication device is switched ON, the GPS receiving unit 13 detects this power-ON (S1), and confirms whether the communication conditions are set in the communication control unit 12 or not (S20).

At this time, the GPS receiving unit 13 of the wireless communication device, if the communication conditions are stored on the memory 12a of the control unit 12, judges that the communication conditions have been set, and has the wireless communications performed based on these communication conditions (S8).

Whereas if judging in S20 that the communication conditions are not set, the GPS receiving unit 13 acquires the position information from the GPS satellite 5 (S2) and sets the communication conditions in the same way as described above.

Thus, the wireless communication device in the embodiment 1 is contrived so that the confirmation as to whether the communication conditions are set or not is made immediately after switching ON the power source, if the communication condition are once set when switching ON the power source, enables the communications to start without executing the process of acquiring the position information and the process of setting the communication conditions when switching ON the power source from the second time onwards. Namely, the wireless communication device in the embodiment 1 is, after setting the communication conditions, capable of reducing the time till the start of the communications since the power source have been switched ON.

Note that if the wireless communication device is moved to a different place for use after setting the communication conditions, the communication conditions stored on the memory 12a are deleted. With this deletion, the wireless communication device sets the communication conditions afresh when switching ON the power source next time (S2 through S7).

§ Embodiment 2

Figure 8:
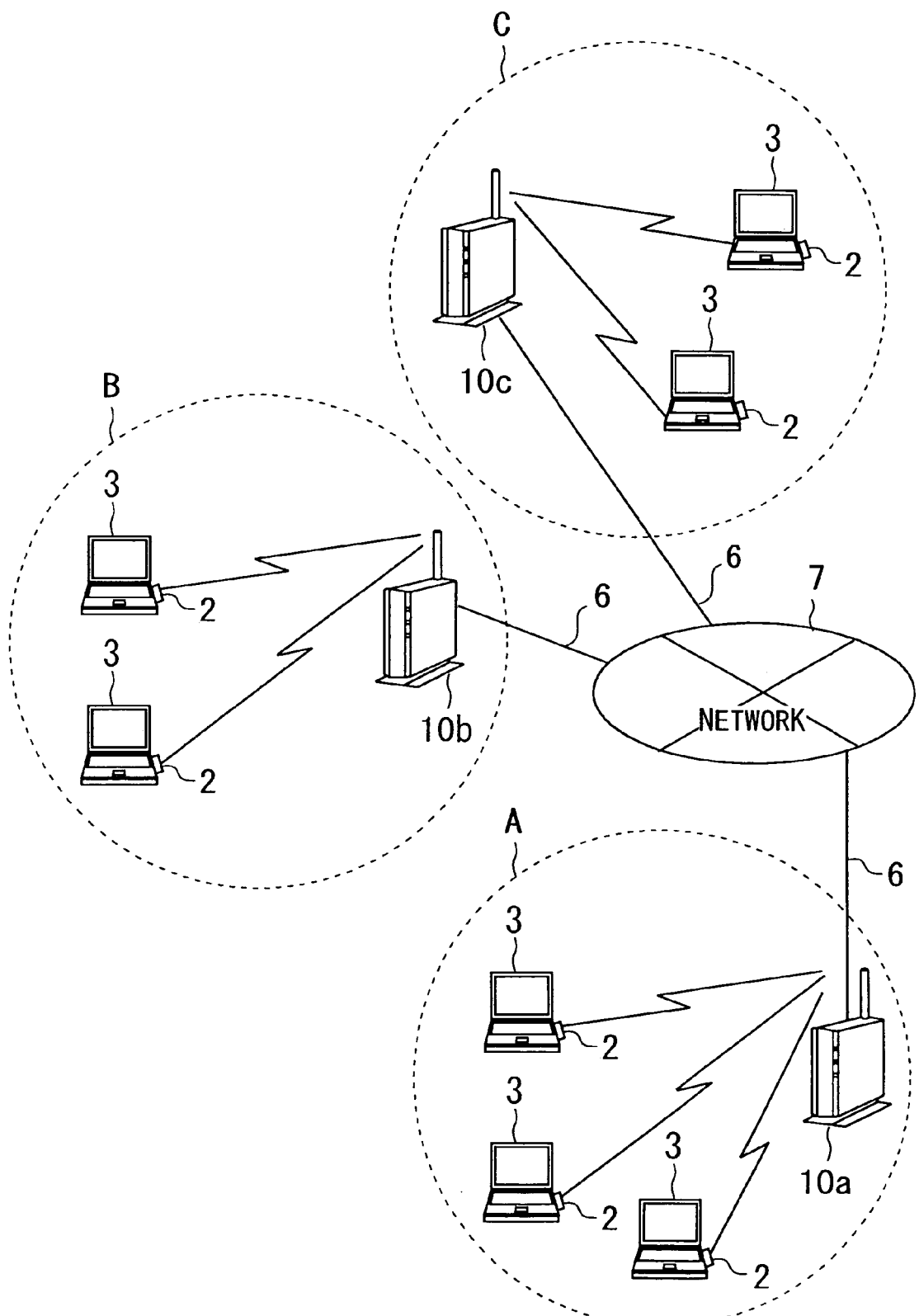
FIG. 8 is an explanatory view showing an outline of an embodiment 2 of the present invention.

FIG. 8 is an explanatory view showing an outline of an embodiment 2 of the present invention. A scheme in the embodiment 2 is that if there exist a plurality of common carriers A, B and C for providing services for establishing connections to a network such as the Internet, etc. by installing wireless LAN access points 10a, 10b in stations, fast-foods restaurants, café shops, etc., the wireless LAN adapter (wireless communication device) 20 according to the present invention, upon its power-ON, judges based on the position information which common carrier has the service providing area where the device exists in, and makes the communications performable by automatically setting the communication conditions for this common carrier. The wireless LAN adapter 20 in the embodiment 2 is different from the wireless LAN adapter 2 in the embodiment 1 discussed above in terms of contents of the position information tables, the contents of the communication condition table and the procedure of setting the communication conditions, however, other configurations are substantially the same as those described above. The same elements as those given above are marked with the same numerals in the embodiment 2, and the repetitive explanations are herein omitted.

FIG. 9 is an explanatory diagram showing a position information table provided in the GPS receiving unit 13. As shown in FIG. 9, this position information table is stored with the common carriers and their position information mapping to each other.

Further, FIG. 10 is an explanatory diagram showing a communication condition table. As shown in FIG. 10, this communication condition table is stored with the common carriers and their communication conditions (IDs, passwords, protocols, etc.) mapping to each other.

Figure 11:
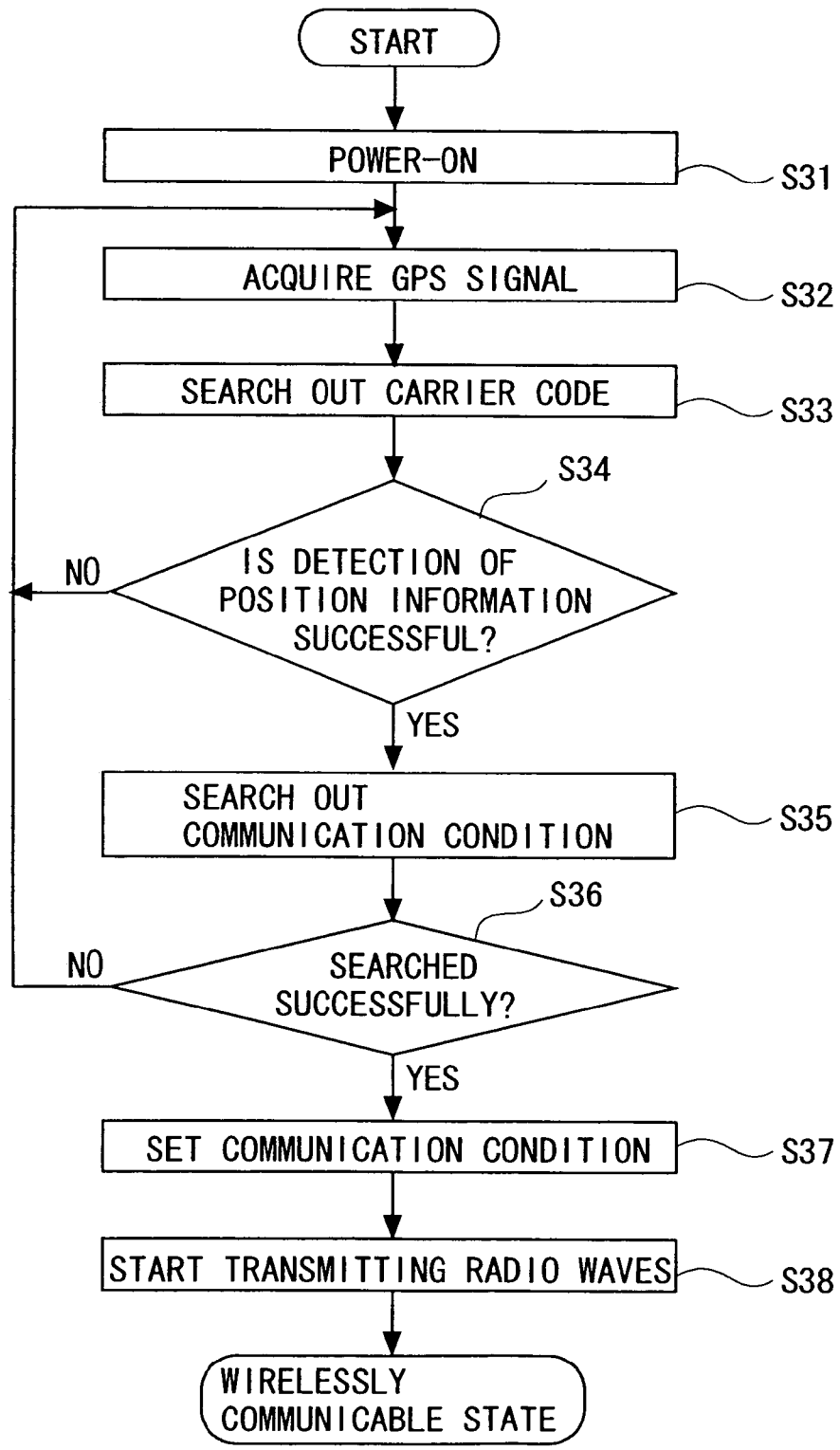
FIG. 11 is a flowchart showing a procedure of setting the communication conditions in a wireless LAN adapter 20.

FIG. 11 is a flowchart showing a procedure (steps) of setting the communication conditions in the wireless LAN adapter 20.

To start with, when the power source in this wireless LAN adapter 20 is switched ON, the GPS receiving unit 13 detects this power-ON (S31), and acquires the position information from the GPS satellite 5 via the GPS antenna 18 (S32).

Then, the GPS receiving unit 13 judges based on the position information which common carrier has the service providing area where the device now exists in. This judgement as to the service providing area may involve adopting arbitrary methods such as presuming that the device is to be located in the service providing area having a nearest access point from the information-acquired position, judging based on whether or not the information-acquired position falls within a predetermined range extending about the access point, judging based on whether or not the information-acquired position is coincident with a position designated for every access point, and so forth. Then, a carrier code specifying the common carrier that provides this service is searched out from the position information table (S33).

The GPS receiving unit 13 judges whether or not the position information thereof has been successfully detected, i.e., the carrier code has been successfully searched out (S34). If unsuccessful, the GPS receiving unit 13 returns to the acquisition of the position information in S32 and, whereas if successful, outputs this carrier code to the communication condition determining unit 15.

The communication condition determining unit 15 having received this carrier code searches out the communication conditions mapping to this carrier code from the communication condition table 14 (S35). The communication condition determining unit 15 judges whether this search-out becomes successful or not (S36) If not successful, the communication condition determining unit 15 moves back to the acquisition of the position information in S32 and, whereas if successful, outputs the searched-out communication conditions to the condition setting unit 16. Then, the condition setting unit 16 sets these communication conditions in the communication control unit 12, i.e., stores the communication conditions on the memory 12a of the communication control unit 12 (S37).

Subsequently, the communication control unit 12 refers to the memory 12a and performs the wireless communications based on these communication conditions (S38).

For example, the wireless LAN adapter 20 in the embodiment 2, upon the power-ON (S31), in the case of having acquired 139 degrees 45 minutes XX seconds XXXX of east longitude and 35 degrees 38 minutes XX seconds XXXX of north latitude as pieces of position information (S32), judges by referring to the position information table that the device is located in the service providing area having a nearest access point 10a, and searches out a carrier code AAA specifying a common carrier A (S33, S34).

The wireless LAN adapter 20 searches out, as the communication conditions mapping to this carrier code AAA, AOOOOO as an ID number, AXXXXX as a password, TCP as a protocol, etc. from the communication condition table 14 (S5, S6).

With this process, the wireless LAN adapter 20 starts the communications connected to the access point 10a of the common carrier A by use of TCP, and sends the ID and the password when logging in a server of the common carrier A.

Thus, according to the embodiment 2, the plurality of connection services through the wireless LANs are provided, and, even when the communications are respectively different, the communications can be performed by selecting the proper communication conditions in accordance with the position information. Namely, the communications can be performed under the different communication conditions without bringing about the intricacy in operation.

Further, a scheme of combining the embodiment 2 with the embodiment 1 discussed above may be taken, wherein the number of channels and the time zone each mapping to the country where the device is utilized are set when switching ON the power source for the first time, and thereafter the ID and the password are set when executing the communications.

§ Other Embodiments

The wireless communication device and the wireless communication method according to the present invention are not limited to the embodiments discussed above and can be, as a matter of course, modified in a variety of forms within the range of the present invention without departing from the spirit of the invention.

For example, the acquisition of the position information and the setting of the communication conditions, are triggered by the power-ON in the embodiments discussed above and may arbitrarily be done if anterior to the start of the wireless communications.

Moreover, the acquisition of the position information and the setting of the communication conditions, are not limited to the scheme of their being triggered by the power-on and may be started by the computers 3, 4 based on a script of communication software.

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. A wireless communication device performing wireless communications with other devices, comprising:
    a communication unit used for performing the wireless communications;
    a communication control unit controlling said communication unit on the basis of a predetermined communication condition;
    a position information acquiring unit recognizing a present position;
    a communication condition determining unit determining a communication condition corresponding to position information acquired by said position information acquiring unit; and
    a condition setting unit setting, in said communication control unit, the communication condition determined by said communication condition determining unit,
    wherein said communication condition determining unit detects, based on the position information, a country in which said device is utilized, and sets an upper limit of the number of channels provided in this country as the communication condition suited to this country.

2. A wireless communication device according to claim 1, wherein said position information acquiring unit acquires the position information by receiving radio waves from a GPS (Global Positioning System) satellite.

3. A wireless communication device according to claim 1, wherein said communication condition determining unit determines at least one of the number of channels, a time zone, an ID and a password as the communication condition.

4. A wireless communication device according to claim 1, wherein said communication condition determining unit detects, based on the position information, a country in which said device is utilized, selects the time zone of this country as the communication condition suited to this country, and determines a local time of this country on the basis of the selected time zone.

5. A wireless communication device performing wireless communications with other devices, comprising:
    a communication unit used for performing the wireless communications;
    a communication control unit controlling said communication unit on the basis of a predetermined communication condition;
    a position information acquiring unit recognizing a present position;
    a communication condition determining unit determining a communication condition corresponding to position information acquired by said position information acquiring unit; and
    a condition setting unit setting, in said communication control unit, the communication condition determined by said communication condition determining unit,
    wherein said communication control unit has a memory for storing the communication condition when a power source of said wireless communication device is switched OFF; and
    wherein said condition setting unit sets the communication condition based on said stored communication condition when said power source of said wireless communication device is switched ON.

* * * * *